United States Patent
Fischer et al.

(10) Patent No.: US 8,948,816 B2
(45) Date of Patent: Feb. 3, 2015

(54) TIMING ADJUSTMENTS FOR SMALL CELL DISTRIBUTED ANTENNA SYSTEMS

(71) Applicant: ADC Telecommunications, Inc., Shakopee, MN (US)

(72) Inventors: Larry G. Fischer, Waseca, MN (US); Kenneth Anderson Stewart, Sunnyvale, CA (US); Lance K. Uyehara, San Jose, CA (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 13/765,848

(22) Filed: Feb. 13, 2013

(65) Prior Publication Data

US 2013/0210490 A1    Aug. 15, 2013

Related U.S. Application Data

(60) Provisional application No. 61/598,668, filed on Feb. 14, 2012.

(51) Int. Cl.
*H04B 1/00* (2006.01)
*H04B 1/38* (2006.01)
(Continued)

(52) U.S. Cl.
CPC .............. *H04W 88/08* (2013.01); *H04W 24/02* (2013.01); *H04W 88/085* (2013.01)
USPC ...................... 455/561; 455/435.1; 455/456.5

(58) Field of Classification Search
USPC ........... 455/101, 418–420, 422.1, 432, 435.1, 455/456.1, 456.2, 456.5, 550.1, 552.1, 561, 455/562.1
See application file for complete search history.

(56) References Cited

U.S. PATENT DOCUMENTS

| | | | |
|---|---|---|---|
| 5,528,597 | A | 6/1996 | Gerzberg et al. |
| 6,094,421 | A | 7/2000 | Scott |
| RE41,936 | E | 11/2010 | Woodhead et al. |

(Continued)

FOREIGN PATENT DOCUMENTS

| | | |
|---|---|---|
| KR | 1020080015462 | 2/2008 |
| KR | 1020110104957 | 9/2011 |
| WO | 2006135697 | 12/2006 |
| WO | 2010083115 | 7/2010 |

OTHER PUBLICATIONS

International Searching Authority, "International Search Report", "From foreign counterpart of U.S. Appl. No. 13/765,848", Jun. 2, 2013, pp. 1-16, Published in: WO.

(Continued)

*Primary Examiner* — Nhan Le
(74) *Attorney, Agent, or Firm* — Fogg & Powers LLC (57) ABSTRACT

A distributed antenna system includes a host unit communicatively coupled to a first service provider interface which receives a first signal from the first service provider interface; and a first remote antenna unit communicatively coupled to the host unit, the first remote antenna unit having a first antenna. A base station to which the distributed antenna system is communicatively coupled is configured with a subscriber access timing window having a minimum allowed delay and a maximum allowed delay. The distributed antenna system is configured so that a first total delay between the host unit and the first remote antenna unit is equal to or greater than the minimum allowed delay. The first antenna of the first remote antenna unit is configured to communicate the first signal to a first subscriber unit.

44 Claims, 5 Drawing Sheets

(51) Int. Cl.
   *H04W 88/08* (2009.01)
   *H04W 24/02* (2009.01)

(56) References Cited

U.S. PATENT DOCUMENTS

2009/0309469 A1    12/2009   Wayman
2010/0226296 A1*    9/2010   Wala et al. .................... 370/294
2011/0237182 A1*    9/2011   Stratford et al. .................. 455/7
2012/0120821 A1     5/2012   Kazmi et al.

OTHER PUBLICATIONS

The International Bureau of WIPO, "Interntional Preliminary Report on Patentability and Written Opinion From PCT Application No. PCT/US2013/025704", "from Counterpart of U.S. Appl. No. 13/765,848", Aug. 28, 2014, pp. 1-12, Published in: WO.

* cited by examiner

TIMING ADJUSTMENTS FOR SMALL CELL DISTRIBUTED ANTENNA SYSTEMS

CROSS-REFERENCE TO RELATED APPLICATIONS

This application claims the benefit of U.S. Provisional Patent Application Ser. No. 61/598,668, filed on Feb. 14, 2012, which is hereby incorporated herein by reference.

BACKGROUND

This disclosure relates to distributed antenna systems, repeaters, distributed base station systems, and the like.

SUMMARY

A distributed antenna system includes a host unit communicatively coupled to a first service provider interface which receives a first signal from the first service provider interface; and a first remote antenna unit communicatively coupled to the host unit, the first remote antenna unit having a first antenna. A base station to which the distributed antenna system is communicatively coupled is configured with a subscriber access timing window having a minimum allowed delay and a maximum allowed delay. The distributed antenna system is configured so that a first total delay between the host unit and the first remote antenna unit is equal to or greater than the minimum allowed delay. The first antenna of the first remote antenna unit is configured to communicate the first signal to a first subscriber unit.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1A:
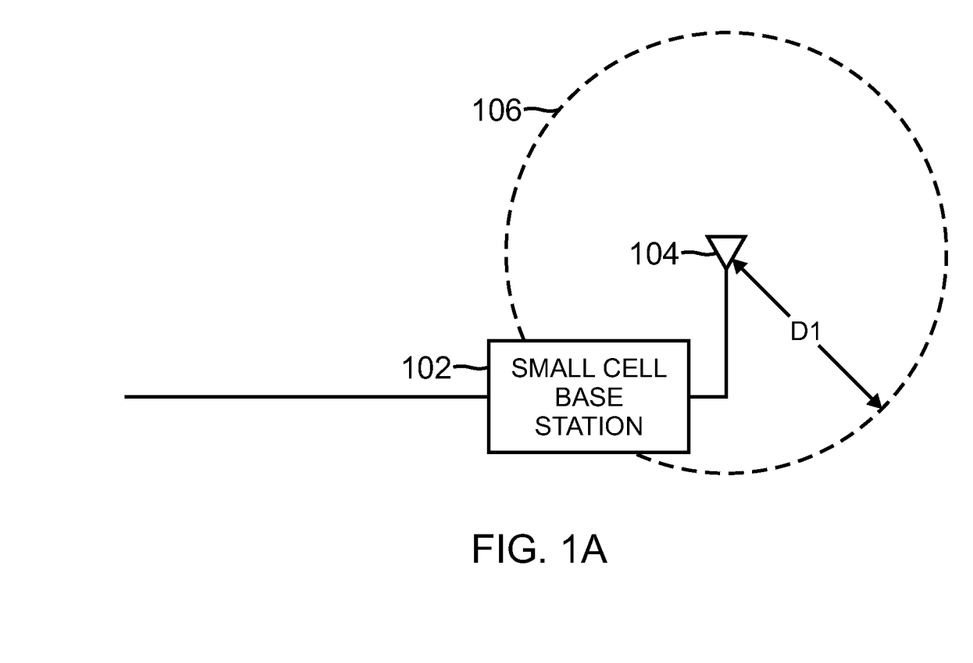
FIG. 1A-1B are block diagrams depicting exemplary embodiments of systems including small cell base stations according to the present disclosure.

FIG. 1A shows an exemplary embodiment of a system including a small cell base station 102 having an antenna 104 and a circular coverage area 106. In exemplary embodiments, the small cell base station 102 is designed to cover a small radius directly surrounding the small cell base station 102 location. This keeps the small cell from interfering with other neighboring cells and trying to capture subscriber units who are further away from the cell while still having strong radio frequency ("RF") signal within the cell. The range of coverage of the small cell is determined by the time delay between when the RF signal leaves the small cell base station 102, is received at the subscriber, and a response is received back at the small cell base station 102. In exemplary embodiments, the calculation of range of coverage of the small cell base station 102 (the area covered by the small cell) is not affected by the RF signal strength of the subscriber at the small cell base station 102 or the RF signal strength at the subscriber. In exemplary embodiments, the small cell base station 102 and/or the subscriber units ensure that it provides sufficient power such that the RF signal strength of the subscriber at the small cell base station 102 and the RF signal strength at the subscriber. In exemplary embodiments, the output power level at the small cell base station 102 and/or the subscriber units is adjusted based on the range of coverage of the small cell base station 102 (the area covered by the small cell). In some implementations, the output power level at the small cell base station 102 and/or the subscriber units are adjusted proportional to any adjustment of the delay. In implementations of such an embodiment, the distance D1 from the center of the circular coverage area 106 to the outer limit of the circular coverage area 106 (the radius of the circular coverage area 106) provided by the small cell base station 102 is less than about 200 meters. In implementations of such an embodiment, the distance D1 relates to a subscriber access timing window during which the small cell base station 102 accepts subscriber responses.

In implementations of such an embodiment, the small cell base station 102 only identifies subscribers that respond with an acknowledgement to a request message from the small cell base station 102 within the subscriber access timing window. In such implementations, the subscriber access timing window has a minimum allowable delay and a maximum allowable delay. In exemplary implementations, the delays are on the order of microseconds. If a first exemplary subscriber's acknowledgement message is received back at the small cell base station 102 within the subscriber access timing window (both after the minimum allowable delay and before the maximum allowable delay), the first exemplary subscriber is considered to be effectively within range of the small cell base station 102 and that subscriber's traffic is routed through the small cell base station 102. If a second exemplary subscriber's acknowledgement message is not received back at the small cell base station 102 before the subscriber access timing window ends (after the maximum allowable delay), the second exemplary subscriber is considered to be effectively too far away and out of range of the small cell base station 102 and that subscriber's traffic is ignored by the small cell base station 102. If a third exemplary subscriber's acknowledgement message is received back at the small cell base station 102 before the subscriber access timing window starts (before the minimum allowable delay), the third exemplary subscriber is considered to be effectively too close and is out of range of the small cell base station 102 and that subscriber's traffic is ignored by the small cell base station 102.

In implementations of such an embodiment, the small cell base station 102 limits the turn around time between the subscriber unit and the base station to limit the radius of coverage. In these implementations, the turn around time is a limit on the amount of time allowed between sending out a request and receiving a response. In exemplary implementations, the turn around times are on the order of milliseconds.

In implementations of such an embodiment, the distance D1 is being limited to reduce multipath, bouncing, and reflection of signals and the actual RF signal strength is not limiting the distance D1. Thus, responses from subscribers within the circular coverage area 106 would fall within the subscriber access timing window of accepted subscriber responses. In implementations of such an embodiment, the subscriber access timing window is adjustable, causing the distance D1 to increase or decrease as the subscriber access timing window increases or decreases.

In implementations of such an embodiment, the use of subscriber access timing windows aid in minimizing the processing overhead at the small cell base station 102. In such implementations, because the small cell base station 102 ignores traffic from subscribers that fall outside of the subscriber access timing window, there is less traffic to process.

In implementations of such an embodiment implementing CDMA or WCDMA, these signals are in the form of code sequences. In such implementations, the subscriber access timing windows are WCDMA subscriber access timing windows. In implementations utilizing WCDMA, rake receivers may also be implemented to capture multiple copies of the signal originating from the transmitter due to multipath, signal blocking, reflection, diffraction, refraction, and the distance from the transmitter. In such implementations, in addition to the subscriber access timing window described above, the rake receivers have smaller windows of time within a frame during which they capture and resolve multiple timeshifted copies of signals from subscribers into a single signal. In such implementations, a range of timeslots within the frame are processed by the rake receiver to resolve the signal. In some implementations using WCDMA, each rake receivers have multiple sub-radios (called fingers) that collect the energy at different timeslots surrounding the expected timeslot for a particular subscriber's signal (such as a code) to resolve the plurality of time delayed and/or time advanced signals into a single signal for the subscriber. In implementations using WCDMA, small cell base station 102 has fewer sub-radios (fingers) in their rake receivers due to size and cost considerations. In such implementations, a small cell base station 102 may only have a few sub-radios (fingers) in its rake receiver.

In implementations of such an embodiment, the subscriber access timing window is adjusted so that the area of coverage that radiates from a small cell base station 102 antenna forms a ring shaped coverage area (also described as a "donut" shaped area of coverage) having a band of coverage a certain distance away from the radiating antenna and a circular area of no coverage within the ring shaped coverage area (also described as a "donut hole" shaped area of no coverage within the "donut" shaped area of coverage). In implementations of such an embodiment, the subscriber access timing window is adjusted by adding an additional delay to any intrinsic delay at the small cell base station 102. In such implementations, the acceptable range of the subscriber access timing window is pushed out further in time (and accordingly in space) to create the circular area of no coverage within the ring shaped coverage area.

Figure 1B:
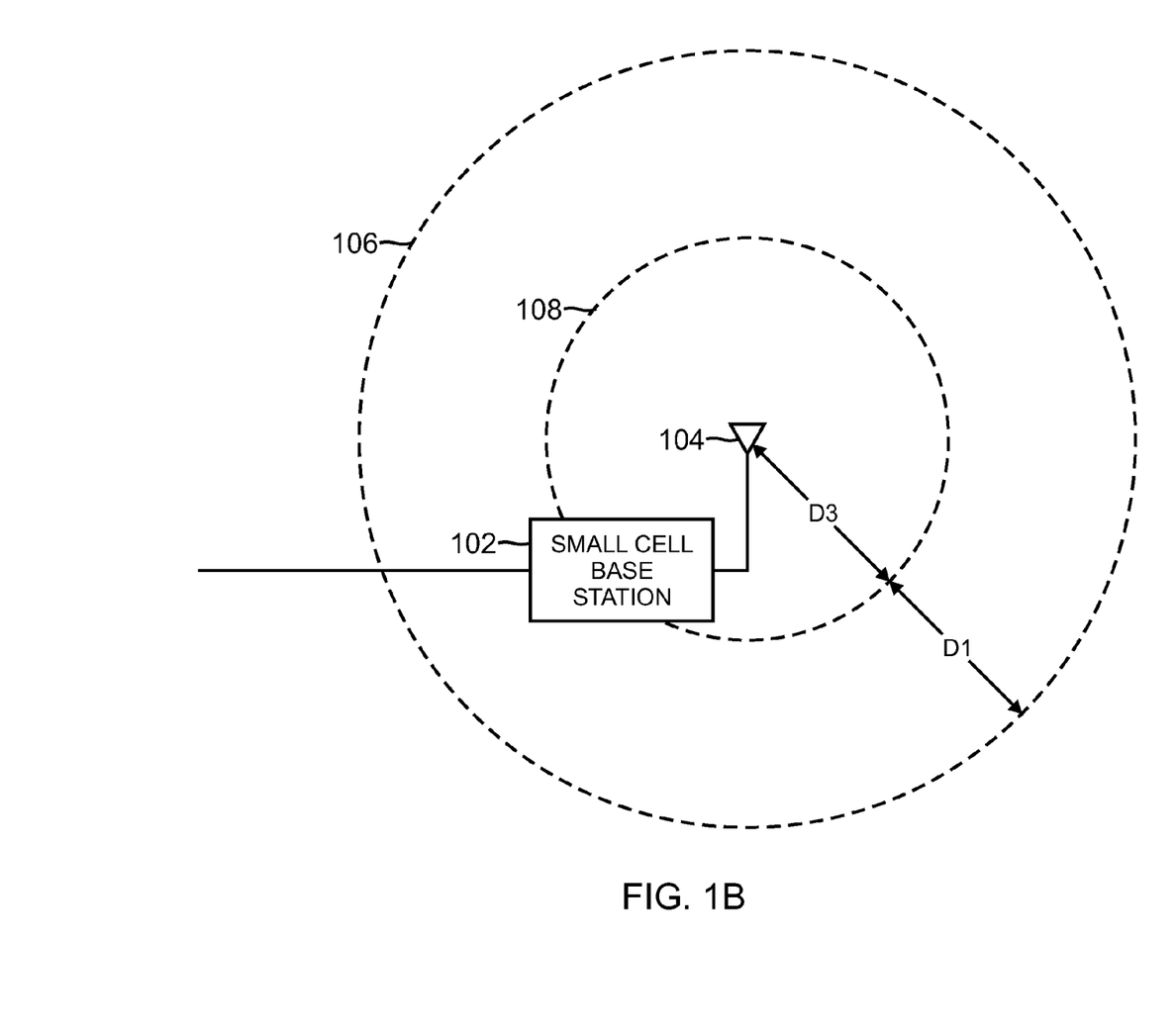

FIG. 1B shows an exemplary embodiment of a system including a small cell base station 102 having an antenna 104 and a ring shaped coverage area 106 with a circular area of no coverage within the ring shaped coverage area 106. In implementations of such an embodiment, the ring shaped coverage area 106 has a thickness of a distance D1 of less than about 200 meters. In implementations of such an embodiment, the circular area of no coverage 108 within the ring shaped coverage area 106 has a distance D3 from its center to the beginning of the ring shaped coverage area 106 that is less than about 200 meters. In implementations of such an embodiment, the ring shaped coverage area 106 with the circular area of no coverage within the ring shaped coverage area 106 is created from the example in FIG. 1 when additional delay is added at the small cell base station 102, thereby causing the subscriber access timing window for accepted subscriber responses to be pushed out. In implementations of such embodiments, this additional delay relates to the distance D3. As this additional delay increases, the distance D3 increases. As this additional delay decreases, the distance D3 decreases. In implementations of such embodiments, the thickness of the ring shaped coverage area 106 can be adjusted based on the subscriber access timing window duration and the size of the circular area of no coverage within the ring shaped coverage area 106 can be adjusted based on the additional time delay added to the small cell base station 102.

In implementations of such embodiments, mobile units would not be able to connect to the base station 102 if they are within the circular area of no coverage 108 because they would respond too quickly to fall within the subscriber access timing window. Similarly, mobile units would not be able to connect to the base station 102 if they are further out than the ring shaped coverage area 106 because they would respond too slowly to fall within the subscriber access timing window. In contrast, mobile units would be able to connect to the base station 102 if they are within the ring shaped coverage area 106 because they would respond within the subscriber access timing window.

In such implementations, a specific amount of delay could be added to the subscriber access timing window. For example, an original subscriber access timing window might have a range of between 0 and 10 microseconds and then additional delay of 30 microseconds is added to the range, causing it to be between 30 and 40 microseconds. Subscribers within the ring shaped coverage area (between 30 and 40 microsecond response time in this example) would be considered "in range" subscribers and those within the circular area of no coverage within the ring shaped coverage area (between 0-30 microseconds response time in this example) or those out past the ring shaped coverage area (greater than 40 microseconds response time in this example) would be considered "out of range" subscribers.

In exemplary embodiments, the signal from the small cell base station 102 can be fed through a distributed antenna system (DAS) 200 and the ring shaped coverage area will be moved in to a certain area, depending on the inherent delay of the distributed antenna system 200 and the desired size of the planned coverage area at a remote antenna unit (RAU) 204 of the distributed antenna system 200. In implementations of such an embodiment, the distributed antenna system 200 has an inherent delay time required for signals to propagate through the distributed antenna system 200. In implementations of such an embodiment, the inherent delay time is equal for all legs of the distributed antenna system 200. In other implementations of such an embodiment, the inherent delay time is different for legs of the distributed antenna system 200 based on the length of each distributed antenna system 200 leg and the various processing, conversions, etc. that occur in the distributed antenna system 200.

In implementations of the digital distributed antenna system 200, the inherent delay of the distributed antenna system 200 uses up the circular area with no coverage within the ring shaped coverage area and causes it to disappear, thereby constricting the ring shaped coverage area down to a circular based coverage area. In implementations of such an embodiment, each of the remote antenna units within the distributed antenna system 200 radiate circular coverage areas. In implementations of such an embodiment, the small base station itself is not used to radiate signals because of its ring shaped coverage area, but instead the remote antenna units of the distributed antenna system 200 are used to cover a particular area.

Figure 2A:
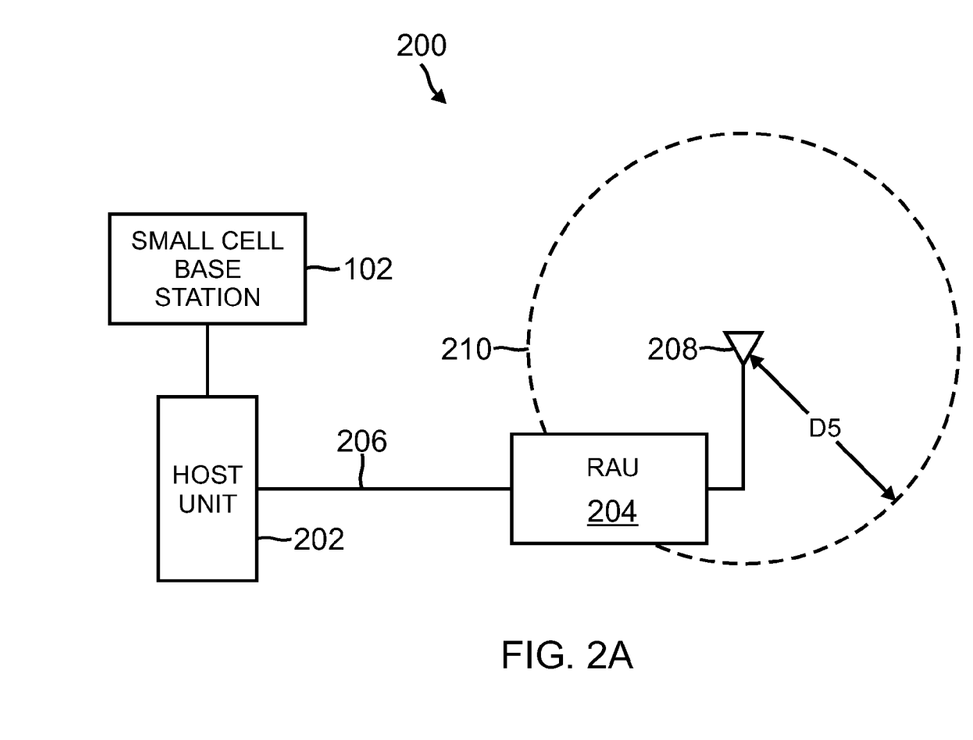
FIGS. 2A-2C are block diagrams depicting exemplary embodiments of systems including small cell base stations and distributed antenna systems according to the present disclosure.

FIG. 2A shows an exemplary embodiment of a system including a small cell base station 102 coupled with a distributed antenna system (DAS) 200 having at least one host unit 202 and at least one remote antenna unit (RAU) 204 coupled to the host unit 202 by a communication link 206. In exemplary implementations, the at least one host unit 202 includes a plurality of service provider interfaces (such as base station transceivers), a switch, and a scheduler. Each service provider interface is configured to output a respective downstream frequency and a respective upstream frequency. The switch is configured to route each of the plurality of downstream frequencies to at least one remote antenna unit 202 and to route each of a plurality of upstream frequencies to respective subset of the service provider interfaces. In exemplary embodiments, the scheduler is co-located with the service provider interfaces. In exemplary embodiments, the host unit 202 further comprises a baseband interface that receives from, and outputs to, the service provider interfaces respective digital baseband data. The baseband interface can optionally be configured to perform protocol conversion between a first baseband protocol used by the base station transceiver and a second baseband protocol used by the plurality of remote antenna units. The baseband interface can optionally be configured to multiplex digital baseband data. In exemplary embodiments, the service provider interfaces comprise a plurality of home node B (HNB) base station transceivers and/or a plurality of enhanced home node B (EHNB) base station transceivers. In one implementation of such an embodiment, each of the plurality of HNB base station transceivers implements at least one third-generation (3G) protocol and/or each of the plurality of EHNB base station transceivers implements at least one fourth-generation (4G) protocol.

In other exemplary implementations, the at least one host unit 202 includes a plurality of reconfigurable baseband processors, a switch, and a system controller. In exemplary embodiments, each of the reconfigurable baseband processors is configured to output a respective downstream frequency and a respective upstream frequency. The switch is configured to route each of a plurality of downstream frequencies to a respective subset of the remote antenna units and to route each of a plurality upstream frequencies to a respective subset of the reconfigurable baseband processors. The system controller implements a scheduler to control the operation of the switch and the base station transceivers. The system controller and the associated scheduler are co-located with the reconfigurable baseband processors. In one implementation, the host unit 202 further comprises a bus that communicatively couples the reconfigurable baseband processors, the system controller, and the switch to one another. The bus can optionally comprise a Peripheral Component Interconnect Express (PCIe) bus. In one implementation, the host unit 202 further comprises a plurality of Small Form-Factor Pluggable (SFP) lasers. In one implementation, the host unit 202 further comprises a plurality of Small Form-Factor Pluggable (SFP) laser modules that are configured to communicatively couple the host unit 202 to the plurality of remote antenna units 204. In one implementation, the reconfigurable baseband processors are configured to output, and receive as input, respective digital baseband data. The digital baseband data can optionally comprise in-phase digital baseband data and quadrature digital baseband data. In one implementation, the reconfigurable baseband processors can be configured to implement at least one of a home node B (HNB) base station transceiver and an enhanced home node B (EHNB) base station transceiver. In one implementation of such an embodiment, the reconfigurable baseband processors can be configured to implement at least one third-generation (3G) protocol and/or at least one fourth-generation (4G) protocol.

In one implementation, the scheduler is implemented as a low-latency joint scheduler (LUS). In one implementation, the switch is implemented as a space-frequency switch (SFS). In one implementation, the host unit 202 is configured to intercept UE reports of cell measurements. In one implementation, the distributed antenna system 200 further comprises a measurement receiver in each remote antenna unit 204 to measure path loss to neighbor remote antenna units 204. In one implementation, the distributed antenna system 200 is configured to monitor traffic and measurement data passing through the system in order to estimate traffic load per remote antenna unit 204 and/or traffic load per user device. The traffic load estimates can optionally be used by the scheduler. In one implementation, the scheduler implements at least one of semi-static scheduling and dynamic scheduling. In one implementation, the system is configured for use with a MIMO protocol. In one implementation, each of the service provider interfaces (base station transceivers) interacts with a carrier network via an Internet protocol (IP) network. Each of the service provider interfaces can optionally be coupled to an access gateway that controls access to the carrier network.

In one implementation, at least some of the remote antenna units 204 are communicatively coupled to the host unit 202 via at least one intermediary device. The intermediary device can optionally comprise an expansion hub. In one implementation, the distributed antenna system 200 is configured to distribute multiple services. In one implementation, the distributed antenna system is coupled to multiple wireless service providers' networks. In one implementation, the distributed antenna system is configured for use in at least one of: in-building applications, outdoor applications, enterprise applications, public safety applications, and military applications. In one implementation, groups of the remote antenna units 204 are configurable for local joint beamforming and/or joint transmission groups of cells. In exemplary embodiments, a plurality of low power remote antenna units 204 with a higher density enable lower cost individual components. Accordingly, the low cost individual remote antenna units 204 can be used in a building block approach to create a network with coverage tailored to a particular application or environment. In exemplary embodiments, the plurality of remote antenna units 204 enable greater reliability.

While the small cell base station 102 and the host unit 202 are described as being separate components above, in exemplary embodiments, the two are combined into a single system or apparatus. In one implementation, the distributed antenna system 200 is configured for use with licensed radio frequency spectrum (including, but not limited to, cellular licensed radio frequency spectrum). In one implementation, the distributed antenna system 200 is configured for use with unlicensed radio frequency spectrum (including, but not limited to, IEEE 802.11 radio frequency spectrum).

The at least one remote antenna unit 204 includes an antenna 208 and a circular coverage area 210. In implementations of such an embodiment, the distance D5 from the center of the circular coverage area 210 to the outer limit of the circular coverage area 210 (the radius of the circular coverage area 210) provided by the remote antenna unit 204 is less than about 200 meters. In implementations of such an embodiment, the distance D5 relates to the subscriber access timing window during which the small cell base station 102 accepts subscriber response described with reference to FIGS. 1A-1B above. In implementations of such an embodiment, the small cell base station 102 does not transmit or receive RF signals from an antenna itself and instead relies upon the distributed antenna system 200 to do the transmission and reception because the small cell base station 102 would have a ring shaped coverage area 108 as shown in FIG. 1B which is not particularly useful because signals transmitted to the ring shaped coverage area 108 have to travel a relatively far distance and will be attenuated by the propagation distance.

In implementations of the digital distributed antenna system 200, the circular coverage area 210 is created from the ring shaped coverage area 106 of FIG. 2A when the signals are passed through the distributed antenna system 200 instead of directly being radiated from the small cell base station 102 and the additional delay added to the signals offsets the additional delay added to the subscriber access timing window in the small cell base station 102. Specifically, a distributed antenna system 200 includes inherent delay in its various legs from any conversion, filtering, propagation, and reconstruction time. In such implementations, the delay caused by converters, analog filters, and the rest of the circuitry surrounding an RF signal could take around 6 microsecond in each direction, for a total of 12 microseconds round trip. In such implementations, the delay from fiber causes it to go slower as well, such that light propagation in fiber optic cables is only about 68% the speed of light propagation in free space. In such implementations, the fiber delay from light propagation through the fiber can be on the order of a few microseconds per mile.

In implementations of the digital distributed antenna system 200, the total delay through the distributed antenna system 200 caused by the inherent delay of the distributed antenna system 200 and the additional delay is subtracted from the subscriber access timing window. In the exemplary implementation described above with a subscriber access timing window between 30 and 40 microseconds where the total delay through the distributed antenna system 200 is 30 microseconds, the subscriber access timing window after being passed through the distributed antenna system 200 is effectively 0 to 10 microseconds.

In implementations of the digital distributed antenna system 200, the inherent delay may include digitization, signal propagation through an optical fiber or other medium, and reconstruction of the RF signals from digitized signals. In implementations of analog distributed antenna system 200, the inherent delay may include conversion to an intermediate frequency, signal propagation through coaxial cable, optical fiber, twisted pair, free space media (or other wireless media), or other media, and reconstruction of the RF signals from the intermediate frequency signals. In implementations of hybrid distributed antenna system 200, the inherent delay may include digitization, signal propagation through an optical fiber or other medium, conversion of digital signals to intermediate frequency analog signals, signal propagation through coaxial cable, optical fiber, free space medium, twisted pair, or other media, and reconstruction of the RF signals from the intermediate frequency signals.

In implementations of the digital distributed antenna system 200, the distance D5 from the center of the circular coverage area 106 to the outer limit of the circular coverage area 106 (the radius of the circular coverage area 106) provided by the small cell base station 102 is less than about 200 meters. In implementations of such an embodiment, the distance D5 relates to a subscriber access timing window during which the small cell base station 102 accepts subscriber responses. Thus, responses from subscribers within the circular coverage area 106 would fall within the subscriber access timing window of accepted "in range" subscriber responses.

In implementations of the digital distributed antenna system 200, the small cell base station 102 has a subscriber access timing window between 30 and 40 microseconds so that it will process acknowledgement messages from subscribers that fall within the 30-40 microsecond subscriber access timing window. Acknowledgement message from subscribers that fall outside of the 30-40 microsecond subscriber access timing window are consider out of range and are ignored. The inherent delay in a leg of the distributed antenna system 200 takes up 30 microseconds, effectively turning the 30-40 microsecond subscriber access timing window of the small cell base station 102 into a 0-10 microsecond subscriber access timing window. In implementations of such an embodiment, an additional delay of 5 microseconds is added to the 30 microsecond inherent delay of the distributed antenna system 200 (totaling to a 35 microsecond delay). In such implementations, the extra five microsecond delay eats into the subscriber access timing window, because it doesn't radiate until 5 microseconds later, so you have effectively shrunk the subscriber access timing window for the remote antenna unit at that particular leg of the distributed antenna system 200 to 5 microseconds (between 0 and 5 microseconds) from 10 microseconds (between 0 and 10 microseconds), thereby reducing the distance D5 accordingly. Thus, by adding additional delay, the size of the circular coverage area 210 can be effectively shrunk to facilitate small cells.

In implementations of the digital distributed antenna system 200, the subscriber access timing window is adjustable, causing the distance D5 to increase or decrease as the subscriber access timing window increases or decreases. In such implementations, the circular coverage area 210 is made smaller by introducing additional delay into the distributed antenna system 200 to effectively cut down the size of the circular coverage area 210. In such implementations, the size of the circular coverage area 210 is optimized at each remote antenna unit fed off the host unit of the distributed antenna system 200. In such implementations, interference from other cells can be reduced by restricting the size of the circular coverage area 106 and not allowing subscriber units outside of the specified timing range to access the system.

In implementations of the digital distributed antenna system 200, the small cell base station 102 communicates RF signals to and from the host unit 202 and the host unit 202 converts the RF signals as appropriate depending on the type of distributed antenna system 200. For example, when the distributed antenna system 200 is a digital distributed antenna system 200 and the small cell base station 102 communicates RF signals, the distributed antenna system 200 converts the RF signals into digitized spectrum and transports that digitized spectrum across a communication link 206 to the remote antenna unit 204. This communication link 206 may be optical fiber, coaxial cable, twisted pair, free space media (or other wireless media) etc. In addition, when the distributed antenna system 200 is an analog distributed antenna system 200 and the small cell base station 102 communicates RF signals, the distributed antenna system 200 converts the RF signals into analog intermediate frequency (IF) signals and transports those IF signals across a communication link 206 to the remote antenna unit 204. This communication link 206 may be optical fiber, coaxial cable, twisted pair, free space media (or other wireless media), etc. In addition, when the distributed antenna system 200 is a hybrid distributed antenna system 200 and the small cell base station 102 communicates RF signals, the distributed antenna system 200 converts the RF signals into digitized spectrum and transports that digitized spectrum across a communication link 206 to a remote server unit that converts the digitized spectrum into analog IF signals and transports the analog IF signals to the remote antenna unit 204. These communication link 206 may be optical fiber, coaxial cable, twisted pair, free space media (or other wireless media), etc.

In implementations of the digital distributed antenna system 200, the small cell base station 102 communicates digital baseband signals (such as I/Q information formatted into the characteristic of an RF channel having a modulation and including in-phase digital baseband data and quadrature digital baseband data) with the host unit 202 and the host unit 202 transports the digitized baseband signals across the communication link 206. For example, when the distributed antenna system 200 is a digital distributed antenna system 200 and the small cell base station 102 communicates digital baseband signals, the master host unit 202 of the distributed antenna system 200 transports the digital baseband signals across a communication link 206 to the remote antenna unit 204. In some implementations, these digital baseband signals are frequency converted before transmission. This communication link 206 may be optical fiber, coaxial cable, twisted pair, free space media (or other wireless media), etc. In addition, when the distributed antenna system 200 is an analog distributed antenna system 200 and the small cell base station 102 communicates digitized baseband signals, the host unit 202 of the distributed antenna system 200 converts the digitized baseband signals to an IF analog signal and transports the IF analog signal across a communication link 206 to the remote antenna unit 204. This communication link 206 may be optical fiber, coaxial cable, twisted pair, free space media (or other wireless media), etc. In addition, when the distributed antenna system 200 is a hybrid distributed antenna system 200 and the small cell base station 102 communicates digital baseband signals, the host unit 202 of the distributed antenna system 200 transports the digitized baseband signals across a communication link 206 to the remote antenna unit 204. In some implementations, these digital baseband signals are frequency converted before transmission. This communication link 206 may be optical fiber, coaxial cable, twisted pair, free space media (or other wireless media), etc.

Figure 2B:
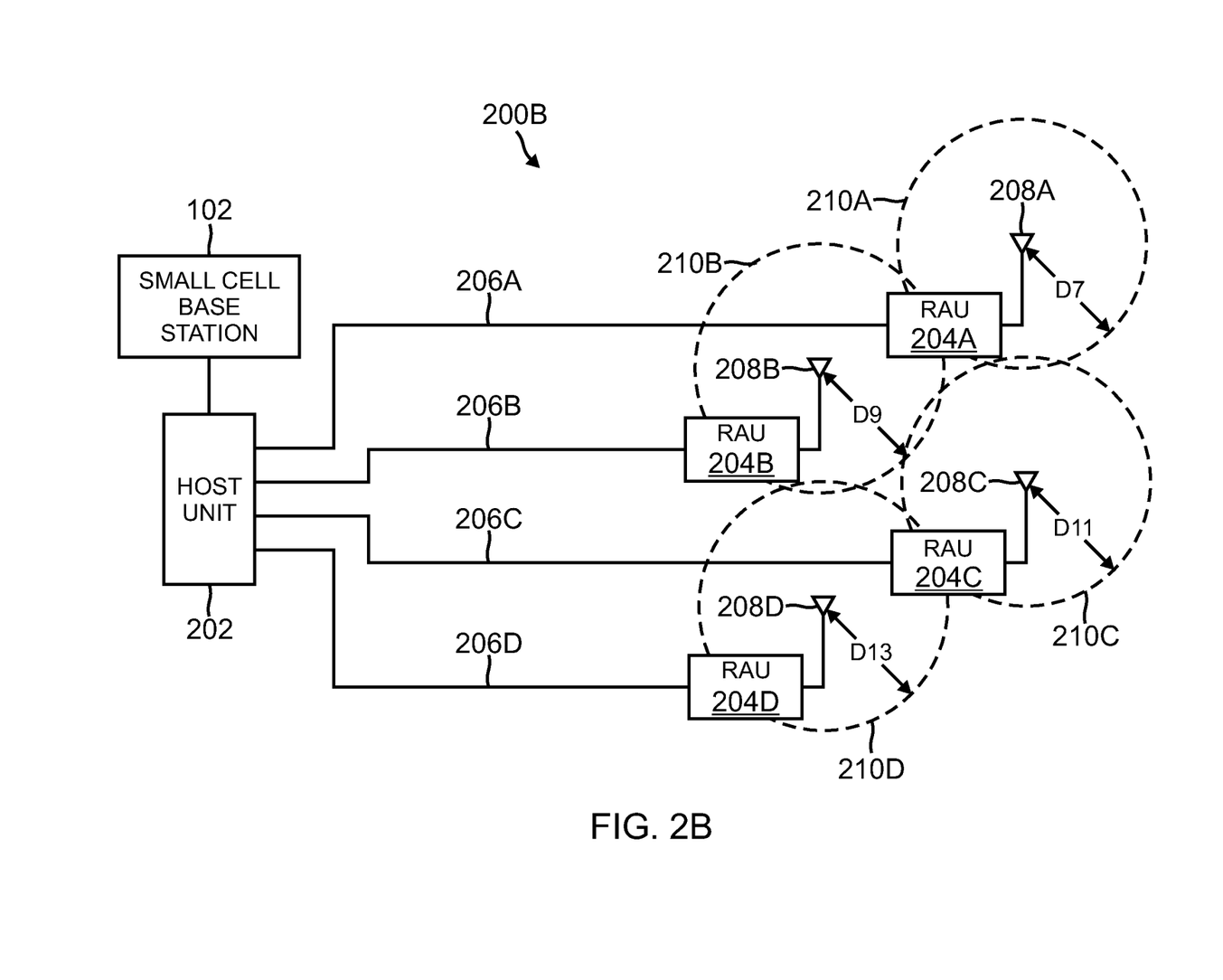
Figure 2C:
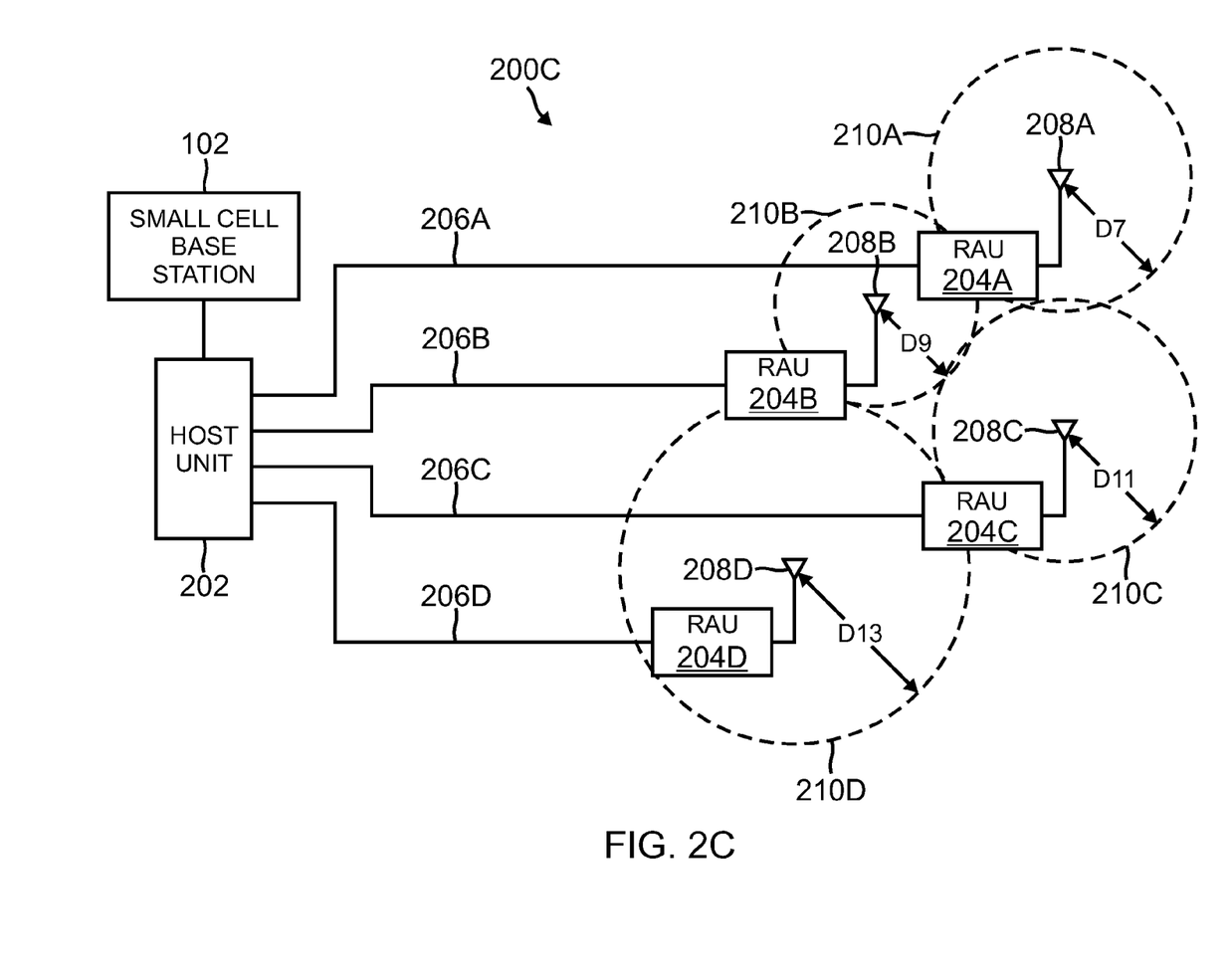

FIGS. 2B-2C show exemplary embodiments of a system including a small cell base station 102 coupled with a distributed antenna system (DAS) 200B having at least one host unit 202 and a plurality of remote antenna units 204A-204D coupled to the host unit 202 by communications links 206A-206D respectively. The plurality of remote units 204 include antennas 208A-208D and circular coverage area 210A-210D respectively. In implementations of such an embodiment, each of distances D7, D9, D11, and D13 from the center of circular coverage areas 210A-210D respectively to the outer limit of the circular coverage area 210A-210D respectively (the radius of the circular coverage area 210) provided by the remote antenna unit 204 is less than about 200 meters. In implementations of such an embodiment, the distances D7, D9, D11, and D13 relate to the subscriber access timing window during which the small cell base station 102 accepts subscriber response described with reference to FIGS. 1-2 above.

In implementations of such an embodiment, additional delay can be added to various legs of the distributed antenna system 200B to further constrict the size of the various circular coverage areas at various remote antenna units of the various legs of the distributed antenna system 200B. In such implementations, the circular coverage areas of the remote antenna units of the various legs of the distributed antenna system 200B can be tailored to specific sizes that facilitate appropriate coverage in a particular area without causing interference to other areas of coverage provided by remote antenna units of other legs of the distributed antenna system 200B, remote antenna units from other distributed antenna systems, small cell base stations, or other types of base stations.

In the exemplary distributed antenna system 200B of FIG. 2B, each of circular coverage area 210A-210D are of the same size, meaning the same total delay of each leg in the distributed antenna system 200B (including the inherent delay and additional delay of each leg) is equal. In contrast, the exemplary distributed antenna system 200C of FIG. 2C includes circular coverage areas 210A-210D of various sizes. Specifically, distance D9 from the center of circular coverage area 210B is smaller than distances D7 and D11 from the center of circular coverage areas 210A and 210C. In addition, distance D13 from the center of circular coverage area 210D is greater than distances D7 and D11 from the center of circular coverage areas 210A and 210C. In implementations of the digital distributed antenna system 200C, the subscriber access timing windows of the various legs of the distributed antenna system 200 have been adjusted, causing the distances D7, D9, D11, and D13 to change with respect to one another. Thus, in implementations of the digital distributed antenna system 200C, the area serviced by remote antenna unit 204B is smaller than the areas service by remote antenna units 204A and 204C and the areas serviced by remote antenna units 204A and 204C are smaller than the area serviced by remote antenna unit 204D. In implementations of the digital distributed antenna system 200C, the cell size can be reduced to minimize overlapping areas between cells that can cause areas of soft handoffs between the coverage areas of a remote antenna unit in a distributed antenna system and another remote antenna unit and/or base stations.

Additional delay can be added to digital signals described above by using buffering of the signals to delay the signals for a set period of time. In implementations of the digital distributed antenna system 200C, the host unit 202 includes a single buffer for all of the legs. In other implementations of the digital distributed antenna system 200C, the host unit 202 includes a plurality of buffers for the various legs. Additional delay can be added to analog signals described above by using loops of fiber optical cable to add additional length to the propagation of signals, thereby causing delay.

In exemplary embodiments, the small cell base station 102, host unit 202, remote antenna units 204A-204D and/or the subscriber units ensure that sufficient power is provided at the antennas 208A-208D and/or antennas of the subscriber units such that the RF signal strength of the subscriber at the remote antenna units 204A-204D, the host unit 202, and/or the small cell base station 102 and/or the RF signal strength at the subscriber are acceptable for proper reception/demodulation of the RF signals. In exemplary embodiments, the output power level at the small cell base station 102, host unit 202, remote antenna units 204A-204D and/or the subscriber units is adjusted based on the range of the coverage areas 210A-210D of the remote antenna units 204A-204D. In some implementations, the output power level at the antennas 208A-208D of the remote antenna units 204A-204D and/or the subscriber units are adjusted proportional to the adjustment of the delay of the signals to the antennas 208A-208D of the remote antenna units 204A-204D and/or the subscriber units.

A number of embodiments have been described. Nevertheless, it will be understood that various modifications to the described embodiments may be made without departing from the spirit and scope of the claimed invention.

Example Embodiments

Example 1 includes a distributed antenna system comprising: a host unit communicatively coupled to a first service provider interface which receives a first signal from the first service provider interface; a first remote antenna unit communicatively coupled to the host unit, the first remote antenna unit having a first antenna; wherein a base station to which the distributed antenna system is communicatively coupled is configured with a subscriber access timing window having a minimum allowed delay and a maximum allowed delay; wherein the distributed antenna system is configured so that a first total delay between the host unit and the first remote antenna unit is equal to or greater than the minimum allowed delay; and wherein the first antenna of the first remote antenna unit is configured to communicate the first signal to a first subscriber unit.

Example 2 includes the distributed antenna system of Example 1, wherein the first total delay comprises at least one of: a first inherent delay in the distributed antenna system between the host unit and the first remote antenna unit; a first propagation delay between the host unit and the first remote antenna unit; and a first additional configurable delay.

Example 3 includes the distributed antenna system of any of Examples 1-2, wherein the first total delay comprises a first configurable delay.

Example 4 includes the distributed antenna system of any of Examples 1-3, wherein a coverage area of communication from the first antenna of the first remote antenna unit is proportional to the first total delay.

Example 5 includes the distributed antenna system of any of Examples 1-4, wherein a coverage area of communication from the first antenna of the first remote antenna unit becomes smaller as the first total delay increases.

Example 6 includes the distributed antenna system of any of Examples 1-5, wherein the first remote antenna unit is communicatively coupled to the host unit via a physical medium.

Example 7 includes the distributed antenna system of Example 6, wherein the physical medium is at least one of a fiber optical cable, a coaxial cable, or twisted pair.

Example 8 includes the distributed antenna system of any of Examples 1-7, wherein the first remote antenna unit is communicatively coupled to the host unit via a wireless medium.

Example 9 includes the distributed antenna system of any of Examples 1-8, wherein the first service provider interface is configured to output, and receive as input, respective digital baseband data; and wherein the first signal is a digital baseband data signal.

Example 10 includes the distributed antenna system of Example 9, wherein the digital baseband data comprises in-phase digital baseband data and quadrature digital baseband data; and wherein the first signal comprises in phase digital baseband data and quadrature digital baseband data.

Example 11 includes the distributed antenna system of any of Examples 9-10, wherein the host unit further comprises a baseband interface that receives from, and outputs to, the first service provider interface respective digital baseband data.

Example 12 includes the distributed antenna system of Example 11, wherein the baseband interface is configured to perform a protocol conversion between a first baseband protocol used by the first service provider interface and a second baseband protocol used by the first remote antenna unit.

Example 13 includes the distributed antenna system of any of Examples 11-12, wherein the baseband interface is configured to multiplex digital baseband data.

Example 14 includes the distributed antenna system of any of Examples 1-13, wherein the first service provider interface is configured to output, and receive as input, radio frequency signals; and wherein the first signal is a radio frequency signal.

Example 15 includes the distributed antenna system of any of Examples 1-14, wherein the service provider interface interacts with a carrier network via an Internet protocol (IP) network.

Example 16 includes the distributed antenna system of any of Examples 1-15, wherein the first remote antenna unit is communicatively coupled to the host unit via at least one intermediary device.

Example 17 includes the distributed antenna system of Example 16, wherein the intermediary device comprises an expansion hub.

Example 18 includes the distributed antenna system of any of Examples 16-17, wherein the distributed antenna system is a hybrid distributed antenna system; wherein the intermediary device comprises a remote server unit that interfaces between a digital portion of the distributed antenna system and an analog portion of the distributed antenna system; wherein the digital portion of the distributed antenna system includes digital communication between the host unit and the remote server unit; wherein the remote server unit converts between digital and analog signals; and wherein the analog portion of the distributed antenna system includes analog communication between the remote server unit and the first remote antenna unit.

Example 19 includes the distributed antenna system of any of Examples 1-18, wherein the distributed antenna system is configured to distribute multiple services.

Example 20 includes the distributed antenna system of any of Examples 1-19, wherein the distributed antenna system is coupled to multiple wireless service providers' networks.

Example 21 includes the distributed antenna system of any of Examples 1-20, wherein the distributed antenna system is configured for use in at least one of: in-building applications, outdoor applications, enterprise applications, public safety applications, and military applications.

Example 22 includes the distributed antenna system of any of Examples 1-21, further comprising groups of the remote antenna units that are configurable for local joint beamforming and/or joint transmission groups of cells.

Example 23 includes the distributed antenna system of any of Examples 1-22, further comprising: a second remote antenna unit communicatively coupled to the host unit, the second remote antenna unit having a second antenna; wherein the distributed antenna system is configured so that a second total delay between the host unit and the second remote antenna unit is equal to or greater than the minimum allowed delay; and wherein the second antenna of the second remote antenna unit is configured to communicate the first signal to a second subscriber unit.

Example 24 includes the distributed antenna system of Example 23, wherein the second total delay comprises at least one of: a second inherent delay in the distributed antenna system between the host unit and the second remote antenna unit; a second propagation delay between the host unit and the second remote antenna unit; and a second additional configurable delay.

Example 25 includes the distributed antenna system of any of Examples 23-24, wherein a coverage area of communication from the second antenna of the second remote antenna unit is proportional to the second total delay.

Example 26 includes the distributed antenna system of any of Examples 23-25, wherein the second remote antenna unit is communicatively coupled to the host unit via a physical medium.

Example 27 includes the distributed antenna system of Example 26, wherein the physical medium is at least one of a fiber optic cable, a coaxial cable, or twisted pair.

Example 28 includes the distributed antenna system of any of Examples 1-27, further comprising: wherein the host unit is further communicatively coupled to a second service provider interface which receives a second signal from the second service provider interface; and wherein at least one antenna of the first remote antenna unit is configured to communicate the second signal to a second subscriber unit.

Example 29 includes the distributed antenna system of Example 28, wherein the second service provider interface is configured to output, and receive as input, respective digital baseband data; and wherein the second signal is a digital baseband data signal.

Example 30 includes the distributed antenna system of any of Examples 28-29, wherein the second service provider interface is configured to output, and receive as input, radio frequency signals; and wherein the second signal is a radio frequency signal.

Example 31 includes the distributed antenna system of any of Examples 28-30, wherein the second remote antenna unit is communicatively coupled to the host unit via at least one intermediary device.

Example 32 includes the distributed antenna system of any of Examples 1-31, further comprising: wherein the host unit is further communicatively coupled to a second service provider interface which receives a second signal from the service provider interface; a second remote antenna unit communicatively coupled to the host unit, the second remote antenna unit having a second antenna; wherein the distributed antenna system is configured so that a second total delay between the host unit and the second remote antenna unit is equal to or greater than the minimum allowed delay; and wherein the second antenna of the second remote antenna unit is configured to communicate the second signal to a second subscriber unit.

Example 33 includes the distributed antenna system of Example 32, wherein the second total delay comprises at least one of: a second inherent delay in the distributed antenna system between the host unit and the second remote antenna unit; a second propagation delay between the host unit and the second remote antenna unit; and a second additional configurable delay.

Example 34 includes the distributed antenna system of any of Examples 32-33, wherein the second remote antenna unit is communicatively coupled to the host unit via a physical medium.

Example 35 includes the distributed antenna system of any of Examples 32-34, wherein the second service provider interface is configured to output, and receive as input, respective digital baseband data; and wherein the second signal is a digital baseband data signal.

Example 36 includes the distributed antenna system of any of Examples 32-35 wherein the second service provider interface is configured to output, and receive as input, radio frequency signals; and wherein the second signal is a radio frequency signal.

Example 37 includes the distributed antenna system of Example 32, wherein the second remote antenna unit is communicatively coupled to the host unit via at least one intermediary device.

Example 38 includes the distributed antenna system of Example 37, wherein the distributed antenna system is a hybrid distributed antenna system; wherein the intermediary device comprises a remote server unit that interfaces between a digital portion of the distributed antenna system and an analog portion of the distributed antenna system; wherein the digital portion of the distributed antenna system includes digital communication between the host unit and the second remote server unit; wherein the remote server unit converts between digital and analog signals; and wherein the analog portion of the distributed antenna system includes analog communication between the remote server unit and the second remote antenna unit.

Example 39 includes a method comprising: configuring a distributed antenna system to have a first additional delay in addition to a first inherent delay of the distributed antenna system between a host unit and a first remote antenna unit; wherein the distributed antenna system is communicatively coupled to a base station configured with a subscriber access timing window having a minimum allowed delay and a maximum allowed delay; and wherein a first total delay of the first additional delay and the first inherent delay of the distributed antenna system is equal to or greater than the minimum allowed delay.

Example 40 includes the method of Example 39, wherein the first inherent delay comprises at least one of a propagation delay between the host unit and the first remote antenna unit.

Example 41 includes the method of any of Examples 39-40, wherein a coverage area of communication from a first antenna of the first remote antenna unit is proportional to the first total delay.

Example 42 includes the method of any of Examples 39-41, further comprising transporting signals from the base station through the distributed antenna system via a physical medium.

Example 43 includes the method of any of Examples 39-42, further comprising communicating digital baseband data between a service provider interface of the base station and the host unit of the distributed antenna system.

Example 44 includes the method of any of Examples 39-43, further comprising communicating radio frequency signals between a service provider interface of the base station and the host unit of the distributed antenna system.

Example 45 includes the method of any of Examples 39-44, further comprising: configuring a distributed antenna system to have a second additional delay in addition to a second inherent delay of the distributed antenna system between the host unit and a second remote antenna unit; and wherein a second total delay of the second additional delay and the second inherent delay of the distributed antenna system is equal to or greater than the minimum allowed delay.

Example 46 includes a distributed antenna system comprising: a host unit communicatively coupled to a first service provider interface which receives a first signal from the first service provider interface; a first remote antenna unit communicatively coupled to the host unit; wherein a base station to which the distributed antenna system is communicatively coupled is configured with a subscriber access timing window having a minimum allowed delay and a maximum allowed delay; and wherein the distributed antenna system is configured so that a first total delay between the host unit and the first remote antenna unit is equal to or greater than the minimum allowed delay.

What is claimed is:

1. A distributed antenna system comprising:
   a host unit communicatively coupled to a first service provider interface which receives a first signal from the first service provider interface;
   a first remote antenna unit communicatively coupled to the host unit, the first remote antenna unit having a first antenna;
   wherein a base station to which the distributed antenna system is communicatively coupled is configured with a subscriber access timing window having a minimum allowed delay and a maximum allowed delay;
   wherein the distributed antenna system is configured so that a first total delay between the host unit and the first remote antenna unit is equal to or greater than the minimum allowed delay; and
   wherein the first antenna of the first remote antenna unit is configured to communicate the first signal to a first subscriber unit, wherein a coverage area of communication from the first antenna of the first remote antenna unit is proportional to the first total delay.

2. The distributed antenna system of claim 1, wherein the first total delay comprises at least one of:
   a first inherent delay in the distributed antenna system between the host unit and the first remote antenna unit;
   a first propagation delay between the host unit and the first remote antenna unit; and
   a first additional configurable delay.

3. The distributed antenna system of claim 1, wherein the first total delay comprises a first configurable delay.

4. The distributed antenna system of claim 1, wherein a coverage area of communication from the first antenna of the first remote antenna unit becomes smaller as the first total delay increases.

5. The distributed antenna system of claim 1, wherein the first remote antenna unit is communicatively coupled to the host unit via a physical medium.

6. The distributed antenna system of claim 5, wherein the physical medium is at least one of a fiber optical cable, a coaxial cable, or twisted pair.

7. The distributed antenna system of claim 1, wherein the first remote antenna unit is communicatively coupled to the host unit via a wireless medium.

8. The distributed antenna system of claim 1, wherein the first service provider interface is configured to output, and receive as input, respective digital baseband data; and
   wherein the first signal is a digital baseband data signal.

9. The distributed antenna system of claim 8, wherein the digital baseband data comprises in-phase digital baseband data and quadrature digital baseband data; and
   wherein the first signal comprises in phase digital baseband data and quadrature digital baseband data.

10. The distributed antenna system of claim 8, wherein the host unit further comprises a baseband interface that receives from, and outputs to, the first service provider interface respective digital baseband data.

11. The distributed antenna system of claim 10, wherein the baseband interface is configured to perform a protocol conversion between a first baseband protocol used by the first service provider interface and a second baseband protocol used by the first remote antenna unit.

12. The distributed antenna system of claim 10, wherein the baseband interface is configured to multiplex digital baseband data.

13. The distributed antenna system of claim 1, wherein the first service provider interface is configured to output, and receive as input, radio frequency signals; and
   wherein the first signal is a radio frequency signal.

14. The distributed antenna system of claim 1, wherein the service provider interface interacts with a carrier network via an Internet protocol (IP) network.

15. The distributed antenna system of claim 1, wherein the first remote antenna unit is communicatively coupled to the host unit via at least one intermediary device.

16. The distributed antenna system of claim 15, wherein the intermediary device comprises an expansion hub.

17. The distributed antenna system of claim 15, wherein the distributed antenna system is a hybrid distributed antenna system;
   wherein the intermediary device comprises a remote server unit that interfaces between a digital portion of the distributed antenna system and an analog portion of the distributed antenna system;
   wherein the digital portion of the distributed antenna system includes digital communication between the host unit and the remote server unit;
   wherein the remote server unit converts between digital and analog signals; and
   wherein the analog portion of the distributed antenna system includes analog communication between the remote server unit and the first remote antenna unit.

18. The distributed antenna system of claim 1, wherein the distributed antenna system is configured to distribute multiple services.

19. The distributed antenna system of claim 1, wherein the distributed antenna system is coupled to multiple wireless service providers' networks.

20. The distributed antenna system of claim 1, wherein the distributed antenna system is configured for use in at least one of: in-building applications, outdoor applications, enterprise applications, public safety applications, and military applications.

21. The distributed antenna system of claim 1, further comprising groups of the remote antenna units that are configurable for local joint beamforming and/or joint transmission groups of cells.

22. The distributed antenna system of claim 1, further comprising:
   a second remote antenna unit communicatively coupled to the host unit, the second remote antenna unit having a second antenna;
   wherein the distributed antenna system is configured so that a second total delay between the host unit and the second remote antenna unit is equal to or greater than the minimum allowed delay; and
   wherein the second antenna of the second remote antenna unit is configured to communicate the first signal to a second subscriber unit.

23. The distributed antenna system of claim 22, wherein the second total delay comprises at least one of:
   a second inherent delay in the distributed antenna system between the host unit and the second remote antenna unit;
   a second propagation delay between the host unit and the second remote antenna unit; and
   a second additional configurable delay.

24. The distributed antenna system of claim 22, wherein a coverage area of communication from the second antenna of the second remote antenna unit is proportional to the second total delay.

25. The distributed antenna system of claim 22, wherein the second remote antenna unit is communicatively coupled to the host unit via a physical medium.

26. The distributed antenna system of claim 25, wherein the physical medium is at least one of a fiber optic cable, a coaxial cable, or twisted pair.

27. The distributed antenna system of claim 1, further comprising:
wherein the host unit is further communicatively coupled to a second service provider interface which receives a second signal from the second service provider interface; and
wherein at least one antenna of the first remote antenna unit is configured to communicate the second signal to a second subscriber unit.

28. The distributed antenna system of claim 27, wherein the second service provider interface is configured to output, and receive as input, respective digital baseband data; and
wherein the second signal is a digital baseband data signal.

29. The distributed antenna system of claim 27, wherein the second service provider interface is configured to output, and receive as input, radio frequency signals; and
wherein the second signal is a radio frequency signal.

30. The distributed antenna system of claim 27, wherein the second remote antenna unit is communicatively coupled to the host unit via at least one intermediary device.

31. The distributed antenna system of claim 1, further comprising:
wherein the host unit is further communicatively coupled to a second service provider interface which receives a second signal from the service provider interface;
a second remote antenna unit communicatively coupled to the host unit, the second remote antenna unit having a second antenna;
wherein the distributed antenna system is configured so that a second total delay between the host unit and the second remote antenna unit is equal to or greater than the minimum allowed delay; and
wherein the second antenna of the second remote antenna unit is configured to communicate the second signal to a second subscriber unit.

32. The distributed antenna system of claim 31, wherein the second total delay comprises at least one of:
a second inherent delay in the distributed antenna system between the host unit and the second remote antenna unit;
a second propagation delay between the host unit and the second remote antenna unit; and
a second additional configurable delay.

33. The distributed antenna system of claim 31, wherein the second remote antenna unit is communicatively coupled to the host unit via a physical medium.

34. The distributed antenna system of claim 31, wherein the second service provider interface is configured to output, and receive as input, respective digital baseband data; and
wherein the second signal is a digital baseband data signal.

35. The distributed antenna system of claim 31 wherein the second service provider interface is configured to output, and receive as input, radio frequency signals; and
wherein the second signal is a radio frequency signal.

36. The distributed antenna system of claim 31, wherein the second remote antenna unit is communicatively coupled to the host unit via at least one intermediary device.

37. The distributed antenna system of claim 36, wherein the distributed antenna system is a hybrid distributed antenna system;
wherein the intermediary device comprises a remote server unit that interfaces between a digital portion of the distributed antenna system and an analog portion of the distributed antenna system;
wherein the digital portion of the distributed antenna system includes digital communication between the host unit and the second remote server unit;
wherein the remote server unit converts between digital and analog signals; and
wherein the analog portion of the distributed antenna system includes analog communication between the remote server unit and the second remote antenna unit.

38. A method comprising:
configuring a distributed antenna system to have a first additional delay in addition to a first inherent delay of the distributed antenna system between a host unit and a first remote antenna unit;
wherein the distributed antenna system is communicatively coupled to a base station configured with a subscriber access timing window having a minimum allowed delay and a maximum allowed delay;
wherein a first total delay of the first additional delay and the first inherent delay of the distributed antenna system is equal to or greater than the minimum allowed delay and
wherein a coverage area of communication from a first antenna of the first remote antenna unit is proportional to the first total delay.

39. The method of claim 38, wherein the first inherent delay comprises at least one of a propagation delay between the host unit and the first remote antenna unit.

40. The method of claim 38, further comprising transporting signals from the base station through the distributed antenna system via a physical medium.

41. The method of claim 38, further comprising communicating digital baseband data between a service provider interface of the base station and the host unit of the distributed antenna system.

42. The method of claim 38, further comprising communicating radio frequency signals between a service provider interface of the base station and the host unit of the distributed antenna system.

43. The method of claim 38, further comprising:
configuring a distributed antenna system to have a second additional delay in addition to a second inherent delay of the distributed antenna system between the host unit and a second remote antenna unit; and
wherein a second total delay of the second additional delay and the second inherent delay of the distributed antenna system is equal to or greater than the minimum allowed delay.

44. A distributed antenna system comprising:
a host unit communicatively coupled to a first service provider interface which receives a first signal from the first service provider interface;
a first remote antenna unit communicatively coupled to the host unit;
wherein a base station to which the distributed antenna system is communicatively coupled is configured with a subscriber access timing window having a minimum allowed delay and a maximum allowed delay;
wherein the distributed antenna system is configured so that a first total delay between the host unit and the first remote antenna unit is equal to or greater than the minimum allowed delay; and wherein a coverage area of communication from a first antenna of the first remote antenna unit is proportional to the first total delay.

* * * * *